(12) United States Patent
Yerrapureddy et al.

(10) Patent No.: US 11,784,910 B2
(45) Date of Patent: Oct. 10, 2023

(54) METHOD AND SYSTEM FOR USING IS-IS FOR SPB IN THE CONTEXT OF A SERVICE PROVIDER NETWORK

(71) Applicant: ALE USA INC., Calabasas, CA (US)

(72) Inventors: Sanjeeva Reddy Yerrapureddy, Calabasas, CA (US); Pramoda Nallur, Calabasas, CA (US)

(73) Assignee: ALE USA INC., Calabasas, CA (US)

( * ) Notice: Subject to any disclaimer, the term of this patent is extended or adjusted under 35 U.S.C. 154(b) by 0 days.

(21) Appl. No.: 18/011,163

(22) PCT Filed: Jun. 24, 2020

(86) PCT No.: PCT/US2020/039459
§ 371 (c)(1),
(2) Date: Dec. 17, 2022

(87) PCT Pub. No.: WO2021/262165
PCT Pub. Date: Dec. 30, 2021

(65) Prior Publication Data
US 2023/0198889 A1 Jun. 22, 2023

(51) Int. Cl.
*H04L 45/122* (2022.01)
*H04L 12/46* (2006.01)
*H04L 45/24* (2022.01)

(52) U.S. Cl.
CPC .......... *H04L 45/122* (2013.01); *H04L 12/462* (2013.01); *H04L 45/24* (2013.01)

(58) Field of Classification Search
CPC .......................... H04L 45/122; H04L 12/462
See application file for complete search history.

(56) References Cited

U.S. PATENT DOCUMENTS

| 9,565,160 | B2 * | 2/2017 | Previdi | H04L 61/30 |
| 2012/0213117 | A1 | 8/2012 | Banerjee et al. | |
| 2013/0077628 | A1 | 3/2013 | Appalla et al. | |
| 2014/0317259 | A1 | 10/2014 | Previdi et al. | |
| 2015/0304127 | A1 | 10/2015 | Xiao | |
| 2016/0149715 | A1 | 5/2016 | Keesara et al. | |

OTHER PUBLICATIONS

International Search Report and Written Opinion with regard to PCT/US2020/039459 dated Oct. 13, 2020.

* cited by examiner

*Primary Examiner* — Zhiren Qin
(74) *Attorney, Agent, or Firm* — BCF LLP

(57) ABSTRACT

A method and system are disclosed, for using Intermediate System to Intermediate System, IS-IS, as control plane for Shortest Path Bridging, SPB, in a network comprising at least a Service Provider Network, SPN (101), and at least two Backbone Edge Bridges, BEBs (121$_j$), connected to the SPN (101). The method comprises, and the BEBs are configured to: forming adjacency between BEBs through LAN Hellos, electing one of the BEBs as a Designated IS, DIS, and an emulated pseudonode, all BEBs creating and flooding non-pseudonode level-1 LSPs, the DIS creating and flooding a Pseudonode level-1 ESP, and periodically sending Complete Sequence Number PDUs, CSNPs, to the other BEBs, and running Shortest Path First, SPF, to calculate the shortest path in the network between BEBs.

19 Claims, 4 Drawing Sheets

METHOD AND SYSTEM FOR USING IS-IS FOR SPB IN THE CONTEXT OF A SERVICE PROVIDER NETWORK

FIELD

The present technology relates to data processing, more particularly to a method and system for using Intermediate System to Intermediate System as control plane, for Shortest Path Bridging, in a network comprising a Service Provider Network.

BACKGROUND

Intermediate System to Intermediate System (IS-IS), defined in ISO/IEC 10589, is a routing protocol to move information efficiently within a network, by determining the best route for packets through a packet-switched network. IEEE 802.1aq Shortest Path Bridging (SPB) enables multipath routing in an Ethernet mesh network by using IS-IS as the protocol for the control plane. The technology allows all paths to be active, supports equal cost paths, and provides shortest path forwarding in the Ethernet mesh network. "IS-IS for SPB" uses an augmented IS-IS to distribute topology information in the form of added Type-Length-Values (TLVs) that contain multicast and topology attributes, and a new Network Layer Protocol Identifier (NLPID), making it an OSI layer 2 efficient routing protocol operating by reliably flooding link state information throughout a network of ISs (Intermediate Systems), such as switches and routers. IS-IS for SPB provides fast convergence, high link efficiency, and supports large Layer 2 topologies.

Generally speaking, the present technology aims at adapting IS-IS for SPB routing protocol to the requirements of using IS-IS for the control plane in a network involving ISs connected to a Service Provider Network (SPN), including of forming multiple adjacencies between ISs, and of shortest path calculation between ISs with the SPN.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art, in particular the limitations to multi-adjacency between ISs in the IS-IS for SPB routing protocol. Removing these limitations entailed in particular:
 arranging to exchange Local Area Network (LAN) hellos between ISs instead of Point-to-Point (P2P) hellos, thereby affecting adjacency formation;
 arranging to treat a multi-access link as a pseudonode to enforce efficient Link State Protocol data units (LSPs) flooding and minimize bandwidth consumption, including by creating a specific LSP as Pseudonode LSP to represent a multi-access network;
 arranging a LSP flooding that is different between a configuration of P2P links, and one of multi-access links; and
 arranging a shortest path calculation that also differs between a configuration of P2P links, and one of multi-access links.

In one aspect, various implementations of the present technology provide a method for using Intermediate System to Intermediate System, IS-IS, as control plane for Shortest Path Bridging, SPB, in a network comprising at least a Service Provider Network, SPN, and at least two Backbone Edge Bridges, BEBs, connected to the SPN, the method comprising:
 forming adjacency, by each one of the BEBs of the at least two BEBs, with each other BEB of the at least two BEBs, by periodically sending a Local Area Network, LAN, IS-IS Hello, IIH, and listening to LAN IIHs received from each other BEB of the at least two BEBs;
 electing one of the BEBs of the at least two BEBs as a Designated IS, DIS, emulating a pseudonode;
 creating by each one of the BEBs of the at least two BEBs, a non-pseudonode level-1 LSP, listing the pseudonode as its neighbor, and flooding it to each other BEB of the at least two BEBs;
 creating by the DIS a Pseudonode level-1 LSP, listing the DIS and each one of the other BEBs of the at least two BEBs as its neighbor, and flooding it to each other BEB of the at least two BEBs;
 sending by the DIS, after the forming adjacency, Complete Sequence Number PDUs, CSNPs, to each other BEB of the at least two BEBs; and
 running Shortest Path First, SPF, by each of the at least two BEBs to calculate the shortest path in the network from itself to each other BEB of the at least two BEBs.

In one embodiment of the method, the LAN IIH is sent to Level 1 IS multicast addresses, with a LAN ID, consisting of the SysID of the DIS plus an octet-long unique ID assigned by the DIS.

In another embodiment of the method, the pseudonode represents a multi-access link, and the Pseudonode level-1 LSP lists all the SPB nodes connected to the multi-access link.

In yet another embodiment of the method, the sending by the DIS of CSNPs is performed periodically.

In another embodiment of the method, the IS-IS for SPB records the list of all hops but the pseudonode during the SPF calculation from one BEB to the other, and the list is used along with ECT mask to break the tie in case SPF finds Equal Cost Multiple Paths, ECMPs.

In another embodiment of the method, a TLV is present in LAN IIHs comprises the fields: Type (1 byte)—252, Length (1 byte)—4, and Value—4 bytes circuit ID.

In another embodiment of the method, the rate of sending LAN IIHs by the DIS, is more than twice the rate of sending LAN IIHs by each other BEB of the at least two BEBs.

In another embodiment of the method, the sending of LAN IIHs is to a multicast MAC address 01-80-C2-00-00-14.

In another embodiment of the method, the sending by the DIS of CSNPs, is to the multicast MAC address 01-80-C2-00-00-14.

In another aspect, various implementations of the present technology provide a Backbone Edge Bridge, BEB, configured, when connected to a Service Provider Network, SPN to which at least another BEB is connected, and in which Intermediate System to Intermediate System, IS-IS, is used as control plane for Shortest Path Bridging, SPB, to:

form adjacency, with the at least other BEB, by periodically sending a Local Area Network, LAN, IS-IS Hello, IIH, and listening to LAN IIHs received from the at least other BEB;

elect itself or the at least other BEB, as a Designated IS, DIS, emulating a pseudonode;

create a non-pseudonode level-1 LSP, listing the pseudonode as its neighbor, and flooding it to the at least other BEB;

if elected as the DIS:
    create a Pseudonode level-1 LSP, listing the DIS and the at least other BEB as its neighbor, and flooding it to the at least other BEB; and
    send, after the forming adjacency, Complete Sequence Number PDUs, CSNPs, to the at least other BEB; and run Shortest Path First, SPF, to calculate the shortest path in the network from itself to the at least other BEB.

In one embodiment, the BEB is configured to send the LAN IIH to Level 1 IS multicast addresses, with a LAN ID, consisting of the SysID of the DIS plus an octet-long unique ID assigned by the DIS.

In another embodiment of the BEB, the pseudonode represents a multi-access link, and the BEB is configured to, when elected as a DIS, send a Pseudonode level-1 LSP listing all the SPB nodes connected to the multi-access link.

In yet another embodiment, the BEB is configured to support a TLV present in LAN IIHs comprising the fields: Type (1 byte)—252, Length (1 byte)—4, and Value—4 bytes circuit ID.

In yet another embodiment, the BEB is configured to send LAN IIHs to a multicast MAC address 01-80-C2-00-00-14.

In yet another embodiment, the BEB is configured to send, when elected as a DIS, CSNPs to the multicast MAC address 01-80-C2-00-00-14.

In the context of the present description, unless expressly provided otherwise, a "Service Provider Network" or "SPN" is intended to include a core network or a backbone infrastructure that a business entity or organization makes available to customers to whom it sells services such as network access and bandwidth availability. This core network or backbone infrastructure, including edges or points of access to it, is made up of switching devices that transmit multicast IS-IS for SPB packets, and implements Layer 2 connectivity between customer networks connected to the edges or access points.

In the context of the present description, unless expressly provided otherwise, a computing system, may refer, but is not limited to, an "electronic device", an "operation system", a "system", a "computer-based system", a "controller unit", a "monitoring device", a "control device" and/or any combination thereof appropriate to the relevant task at hand.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, the expression "processor" in intended to include a single dedicated processor, a single shared processor, or a plurality of individual processors, some of which may be shared. In some aspects of the present technology, the processor may be for example a general purpose processor, such as a central processing unit (CPU), a processor dedicated to a specific purpose, or a processor implemented in a FPGA. Other hardware, conventional and/or custom, may also be included.

In the context of the present description, unless expressly provided otherwise, the expression "memory" is intended to include Random Access storage systems, available on the market at the time of filing this patent application, and any subsequent equivalent technologies becoming available, regardless of their name, consisting in computing system media for storing digital information. An example of such memory may be a Quad Data Rate (QDR) Static Random Access Memory (SRAM).

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
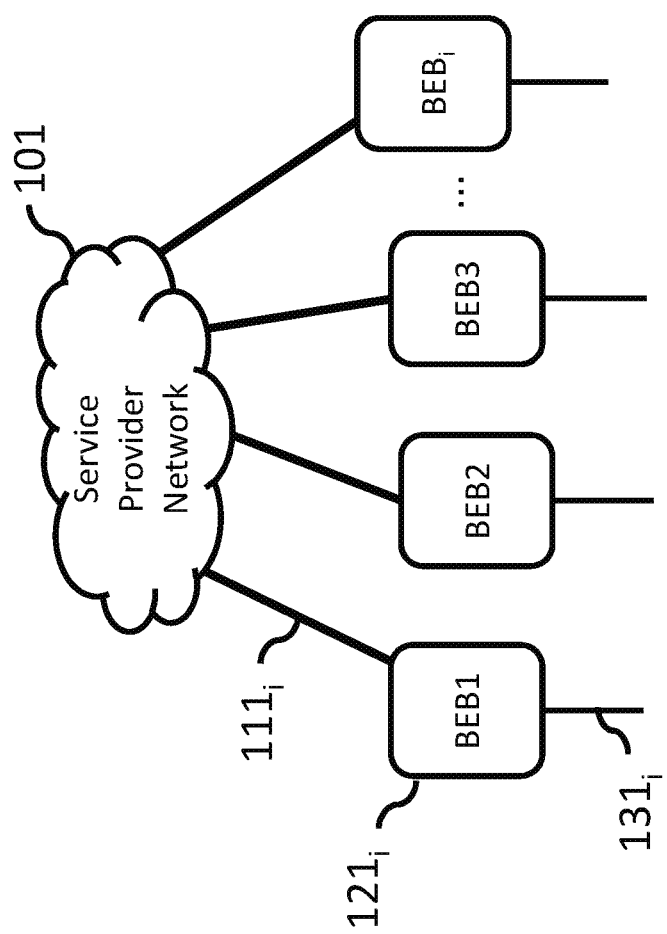
FIG. 1 illustrates an exemplary network topology in which the present technology may be implemented.

FIG. 1 illustrates an exemplary network topology in which the present technology may be implemented. A SPN 101 has a number i of Backbone Edge Bridges (BEB) 121$_i$ connected to it through respective SPB Network-to-Network (NNI) ports 111$_i$. Each of the BEB 121$_i$ has respective Access ports 131$_i$. The BEBs connect customer networks to the SPN.

Before any shortest path tree calculation, the network topology must be discovered first. Adjacency in the IS-IS for SPB routing protocol is ensured by periodic IS-IS Hello (IIH) packets exchanged between ISs. Each IS then sends LSPs containing information about neighboring ISs and associated networks that is flooded across all ISs. Each IS builds a database of the network topology, aggregating the flooded network information. The IS-IS for SPB routing protocol treats a SPN such as SPN 101 (multi-access and Local Area Network (LAN)) as a virtual pseudonode.

In order to form a SPB backbone in the network topology of FIG. 1, each of the BEBs 121$_i$ needs to form adjacencies with all other BEBs connected to the SPN 101, and the shortest path calculation between ISs needs to be performed with the SPN 101. Each one of the ISs, such as BEBs 121$_i$, forms adjacency with each of the other BEBs, by periodically sending IIH packets. One of the BEBs 121$_i$ is elected as a Designated IS (DIS) and plays the role of, or emulates, a pseudonode. The DIS also sends periodic Complete Sequence Number PDUs (CSNPs, with PDU as "Protocol Data Unit") to tell the other ISs about all the LSPs in an IS's database. IS-IS for SPB currently only supports P2P adjacencies: as a result, pseudonodes and links to/from pseudonodes are not considered as part of the IS-IS Shortest Path First (SPF) calculation and will simply be avoided if present in the physical topology. According to the present technology, the following is addressed to adapt IS-IS for SPB to the requirements of forming multiple adjacencies between ISs, and of shortest path calculation between ISs with a SPN:

Adjacency Formation:

On multi-access interfaces LAN IIHs may be exchanged. LAN IIHs carry priority over P2P IIHs and a LAN ID (combination of SysID of the DIS plus an octet-long unique ID assigned by the DIS). The format of the LAN IIH may be as follows (length of fields is indicated in parentheses):

| Intra Domain Routing Protocol Discriminator (8) |
| :---: |
| Length Indicator (8) |
| Version/Protocol ID Extension (8) |
| ID Length (8) |
| R(1)    R(1)    R(1)    PDU Type (5) |
| Version (8) |
| Reserved (8) |
| Maximum Area Addresses (8) |
| Reserved (6)    Circuit Type (2) |
| Source ID (ID Length) |
| Holding Time (16) |
| PDU Length (16) |
| R(1)    Priority (7) |
| Lan ID (ID Length + 1) |
| TLV Fields (variable length) |

The packet type-specific fields for LAN IIHs may be as follows:

Circuit Type: indicates whether this circuit is Level 1-only, Level 2-only, or both (Level 2 or backbone area is not applicable in the present technology)

Source ID: the SysID of the originator

Holding Time: indicates how long to wait for IIHs from this IS before declaring it dead and removing its adjacency PDU Length: length of the entire PDU, fixed header, and Type Length Values (TLVs)

Priority: this 7-bit value designates the priority to be the DIS (Level 1) on the LAN LAN ID: SysID of the DIS plus an octet-long unique ID for this IS assigned by the DIS TLVs may be as follows:

Area Addresses (Type 1): (defined in IS-IS for SPB) it contains area addresses configured on the IS IS Neighbors (Type 6): (defined in IS-IS for SPB) it contains Backbone Media Access Control (B-MAC) addresses (system ID)) of Level 1 neighbors MT Port capability TLV: (defined in IS-IS for SPB) it contains B-VLANs, Equal Cost Tree (ECT) mappings.

IS-IS for SPB routing protocol TLVs may be as follows:

Area Address TLV: this TLV lists the set of area addresses configured on the originating IS. To form a level-1 adjacency there needs to be a common area address configured on both neighboring ISs. An IS may generate up to 255 LSPs, but this TLV should be in the first LSP (zero LSP), or in the first fragment if the LSP is fragmented. This is not relevant for Pseudonode LSPs, so this should be part of non-pseudonode LSPs only. The Area Address TLV is made up of the following fields:

Type (1 byte): 1

Length (1 byte): total length of the Value field

Value: n×(1-byte address length+variable area address)

IS Neighbors TLV: this TLV captures the list of adjacent Level 1 ISs. It consists of the following fields:

Type (1 byte): 6

Length (1 byte): 1 byte+n×(SysID length) for n neighbors

Value: n×(neighbor SysID)

When a LAN interface is enabled for IS-IS for SPB, a BEB may immediately send out IIH packets (destined to all Level 1 IS multicast addresses) with a LAN ID, consisting of the SysID of the DIS plus an octet-long unique ID assigned by the DIS. It may also begin to listen to IIHs to discover any connected adjacencies. It may subsequently run the DIS election process, depending on its configuration, to determine whether it is eligible to be a DIS on the multi-access network.

The way a BEB receives IIHs depends on its configuration (interface type): a LAN IIH is transmitted on LAN interface, and a P2P IIH is transmitted on P2P interface, and if a BEB receives a LAN IIH on a P2P interface, or a P2P IIH on a LAN interface, such an IIH will not be processed by the BEB. All IIHs received are checked for configuration conformity (not different from the case of P2P links). The ID Length and Maximum Area Addresses fields in the received IIHs must match local values.

When a BEB receives an IIH packet, it checks for an existing adjacency with the transmitter. If an adjacency is known, it resets the holding time to the value in the IIH received. If the neighbor is not known, the receiving BEB creates one and sets its state to initializing until subsequent received IIH packets confirm two-way communication. BEBs include the Backbone MAC (B-MAC) addresses or SysID of all neighbors on the LAN that they have received IIHs from, allowing for a simple mechanism to confirm two-way communication. Two-way communication is confirmed when subsequent IIHs received contain the receiving BEB's B-MAC address in an IS Neighbors TLV field. Otherwise, communication between the nodes is deemed one-way, and the adjacency stays at the initialized state. An adjacency must be in and up state for a BEB to send or process received LSPs.

IS-IS for SPB chooses (from configuration) one of the Backbone Virtual LANs (B-VLAN) as control B-VLAN, with all the control packets being transmitted on that VLAN and tagged (IEEE 802.1q) with control-bvlan. All the SPB NNI ports $111_i$ of SPB nodes such as BEBs $121_i$ (FIG. 1) being tagged not only with control-bvlan, but also other B-VLANs, IS-IS IIHs may not be flooded to avoid packet looping. Therefore, where a control packet (multicast) is received, a BEB $121_i$ may consume it without re-flooding it.

Pseudonodes and Pseudonode LSP:

After adjacencies are determined, LSP flooding occurs. To enforce efficient LSP flooding and minimize the bandwidth consumption, multi-access links may be modelled as pseudonodes. As the name implies, this is a virtual node, whose role is played by an elected DIS for the LAN.

In the election process, only BEBs with adjacencies in an up state may be considered. Election of the DIS is based on the highest interface priority, with the highest B-MAC address breaking ties. The default interface priority is 64, which may be changed with configuration.

Each multi-access link may thus be represented with a Pseudonode LSP, generated by the DIS. Pseudonode LSP may list all the SPB nodes connected to a multi-access link, which is represented with Extended IS reachability TLV. A Pseudonode LSP is made up of a IS-IS for SPB LSP header, and one or more Extended IS reachability TLV—one for each IS neighbor on multi-access network, as follows:

TLVs in Pseudonode LSP: the standard Extended IS Reachability TLV (22) may be used to advertise all the neighbors on SPN and the metric to reach these neighbors Extended IS Reachability TLV (Type 22) supporting extended metric values over 3 bytes (to, for example, account for a pseudonode metric in case there is a pseudonode between neighbors), as opposed to 1 byte for IS Neighbors TLV (Type 2). The format for this TLV may be as follows:

Type (1 byte)—22

Length (1 byte)—Total length of the Value field

Value—6 bytes of SysID+1-byte pseudonode number 3 bytes of default metric 1 byte of length of sub-TLVs 0-244 bytes of sub-TLVs The 3 bytes of the metric field may be used to encode the metric as a 24-bit unsigned integer. Sub-TLVs may be reserved as part of the present technology, and may be used for MPLS traffic engineering purposes.

IS-IS LSP:

No backup DIS is elected. This is not an issue with the LSP flooding given the frequency of periodic database synchronization that occurs on broadcast links. If the current DIS fails, another IS is immediately elected to play the role. DIS may transmit IIH packets more frequently (for example three times more frequently) than other ISs on the LAN. The default IIH period for the DIS may for example be 3 seconds rather than 9 seconds for other nodes. This allows for quick detection of DIS failure and immediate replacement.

Periodic database synchronization on broadcast links (periodic transmission of the CSNPs by the DIS) allows preemption of the existing DIS without significant disruption of IS-IS operation. A DIS may cease to be a DIS if a new IS with a higher priority shows up on the LAN, takes over the DIS role, assuming the pseudonode functionality, immediately upon connecting to the LAN.

TLVs in (LAN and P2P) IIHs and (Non-Pseudonode) LSPs:

IS-IS over multi-access uses several TLVs which are already defined in IS-IS for SPB. Some of them are optional. IS-IS for SPB over multi-access also uses these TLVs and no additional TLVs are needed to advertise any additional SPB IS-IS related information. The following table gives a summary of TLVs:

| PDU | TLV | SubTLV | Description |
|---|---|---|---|
| IIH | MT port capability | | To support SPB sub-TLVs in IIH PDUs |
| | | SPB MC-ID (SPB-MCID) | To support SPB sub-TLVs in IIH PDUs |
| | | SPB Digest (SPB-Digest) | To indicate current SPB topology digest value. Used for Loop prevention |
| | | SPB Base V-ID (SPB-B-VID) | To indicate mappings between B-VLANs and ECT-IDs |
| LSP | MT-Capability | | |
| | | SPB-Instance (SPB-Inst) | Gives the SPSourceID for this node/topology instance. |
| | | SPB Instance opaque ECT (SPB-I-OALG) | Future additional ECT algorithms |
| | | SPBM service Identifier and Unicast Address (SPBM-SI) | Maps I-SIDs to B-VLAN and B-MAC |
| | Extended ISIS reachability/MT-Intermediate system | | |
| | | SPB Metric | Link Metric, necessary for distributing cost of links. |
| | | SPB adjacency opaque ECT (SPB-A-OALG) | Future additional ECT algorithms |

As an illustration, let's assume on FIG. 1: $BEB_1$ has a B-MAC address M1, $BEB_2$ a B-MAC address M2, $BEB_3$ a B-MAC address M3, and $BEB_1$ is the DIS. Since the value of TLV 22 is SysID+pseudonode number, $BEB_1$ non-pseudonode LSP may show neighbors as follows:
M1.1 ("1" represents the pseudonode)
$BEB_2$ non-pseudonode LSP may show neighbors as follows:
M2.1
$BEB_3$ non-pseudonode LSP may show neighbors as follows:
M3.1
Pseudonode LSP created by $BEB_1$ may show neighbors as follows ("0" represents a non-pseudonode neighbor):
M1.0
M2.0
M3.0

Database Synchronization:

The database synchronization process may be different from what it is when performed over P2P links. In the case P2P links, CSNPs may be sent only once when the IS-IS adjacency is initialized, preceding the exchange of LSPs over the link. LSPs may be exchanged reliably over point-to-point links in a way that ensures all LSPs sent over the link from one end may be received at the other end. On multi-access links, CSNPs may be transmitted periodically by the DIS to compensate for an LSP exchange process that is not inherently reliable. When a DIS plays the role of, or emulates, a pseudonode, as an abstraction for representing multi-access links as network nodes, this may reduce the number of one-to-one communications in a broadcast environment and, consequently, reduce the amount of information that is exchanged when many nodes interconnect in such environment.

ISs connecting to the same multi-access link may form adjacencies with each other by periodically sending IIHs to multicast addresses known as AllL1IS MAC addresses (01-80-C2-00-00-14). Adjacency maintenance and database synchronization on multi-access links may be independent processes. On multi-access links, LSPs may also multicast to the address AllL1IS, the DIS may coordinate Link-State database synchronization by also periodically multicasting CSNPs to the same multicast address.

Shortest Path Calculation:

The SPF calculation for unicast and multicast on multi-access links is like point-to-point links, but on multi-access links SPF calculation needs to consider Pseudonode LSP to create a shortest path tree over the multi-access links.

Every node's LSP (non-pseudonode LSP) lists the pseudonode as its neighbor on multi-access links and Pseudonode LSP lists all other nodes on a multi-access link as its neighbors. So, the shortest path between 2 nodes on multi-access link goes through the pseudonode.

IS-IS for SPB records the list of all the hops (nodes) during the SPF calculation (Bridge IDs, combination of SysID and priority) from one node to the other in lexicographical order. This list is used along with ECT mask to break the tie in case SPF finds Equal Cost Multiple Paths (ECMPs). SPF doesn't record the pseudonodes in the list of hops, so the pseudonodes may not be considered in the ECMP tie breaking.

Mac-Table:

Assuming for example M1, M2, M3 and M4 are considered as MAC addresses and P1, P2, P3 and P4 are considered as ports connected to the multi-access network for $BEB_1$, $BEB_2$, $BEB_3$ and $BEB_4$ respectively, the SPB MAC table on $BEB_1$ may look like:

| | | |
|---|---|---|
| $BEB_2$ | M2 | P2 |
| $BEB_3$ | M3 | P2 |
| $BEB_4$ | M4 | P2 |

Data Plane:

The MAC in MAC tunnel creation and packet encapsulation is not impacted with the present technology. The data forwarding with/in the service provider network is not in the scope of the present technology.

As shown in the above MAC table $BEB_1$ may forward the traffic on to the port P2 while sending the traffic toward $BEB_2$, $BEB_3$ or $BEB_4$. How the data gets forwarded in the SPN is known and not described as part of the present technology.

Figure 2:
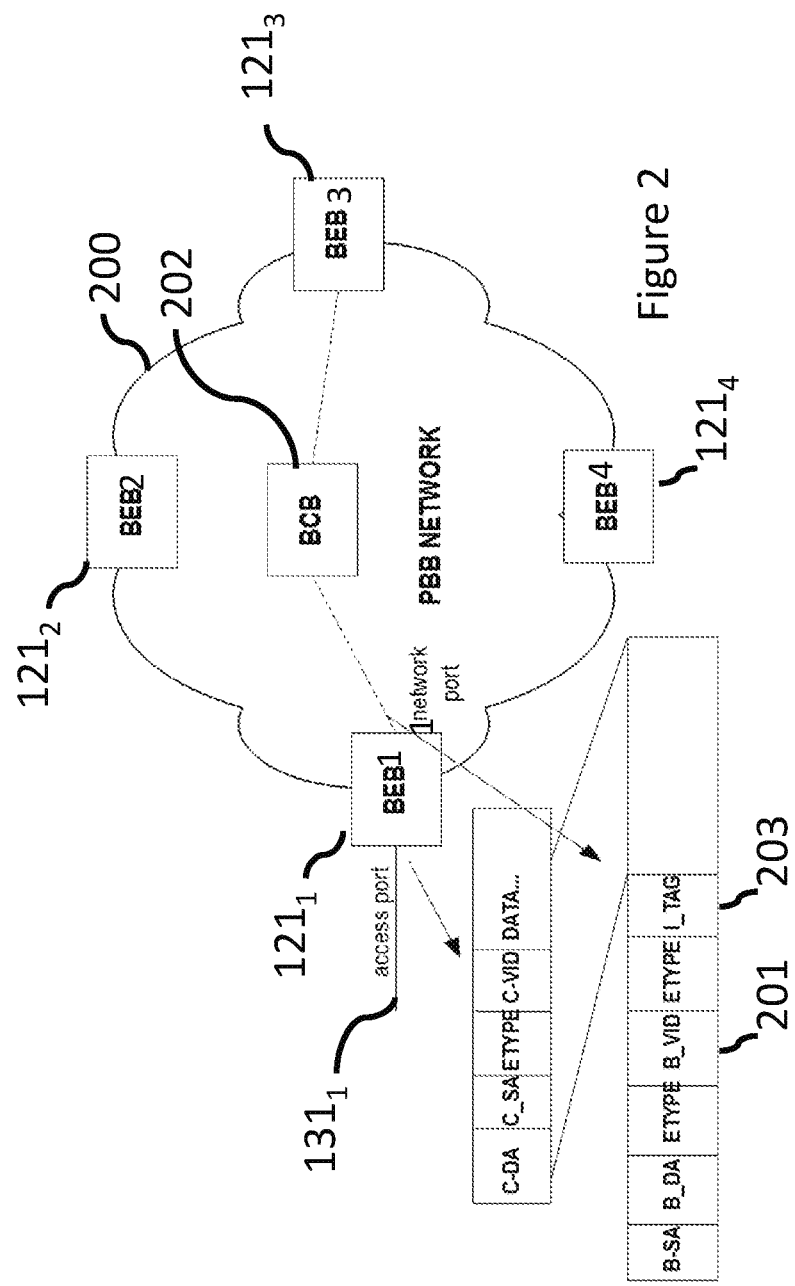
FIG. 2 illustrates a scenario of tunneling a packet through a Provider Backbone Bridging.
Figure 3:
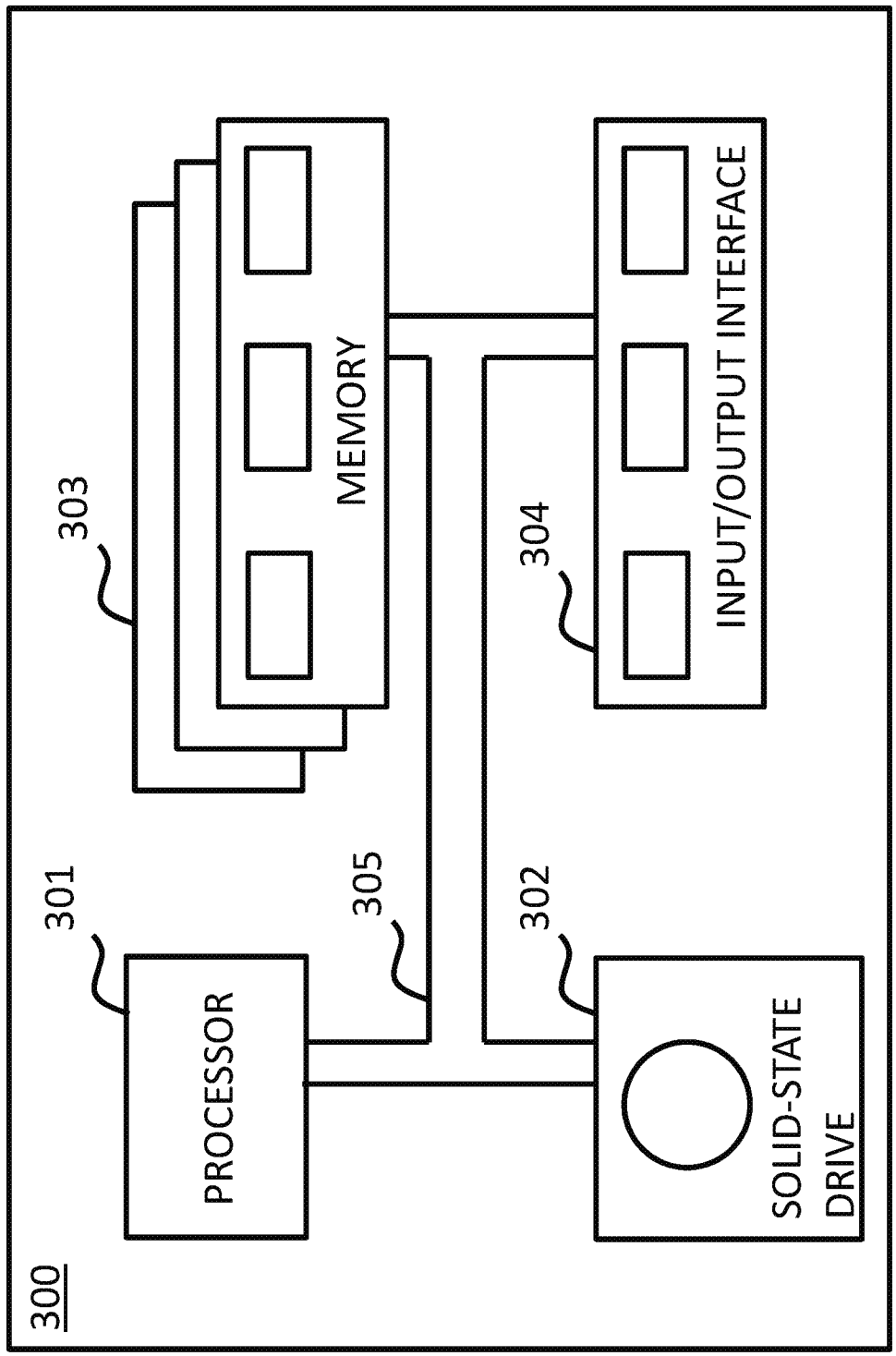
FIG. 3 depicts a computing system that may be used to implement the methods and processes according to the present technology.

Encapsulation method as in IEEE 802.1ah is supported according to the present technology, and basic data forwarding with Provider Backbone Bridging (PBB). When a packet is received on an access port such as $131_i$ (FIG. 1), based on the access port configuration (Ex: assign the packet to SPB service 1 if the VLAN tag is 10) the packet may be classified to a SPB service. At this point the packet may be tunneled through a PBB network 200 illustrated on FIG. 2. The customer frames may be encapsulated in back bone mac addresses (B-MAC) by the BEBs $121_i$ ("mac-in-mac" technique).

B-MACs are the individual mac-address (system mac address) of the BEBs. In addition, frames may also be assigned a new VLAN id called B-VID 201. Further switching of the customer frames by BCBs (Backbone core switches) 202 may use the B-MACs and B-VIDs, and the BCBs 202 learn only B-MACs and not customer MACs. This has two advantages: reduction in the total number of MAC addresses and isolation of the backbone domain from customer domain. The service instance limitation of 4 k s-VLAN may be addressed by assigning a 24-bit instance number (I-SIDs) to the customer frames by the BEBs. I-SIDs are carried in the I-TAG field 203 of the encapsulated frames transmitted by BEBs.

PBB network may use regular bridging mechanisms including the spanning tree protocols for loop resolution within the backbone network. SPB-M may the same framework as described above. The main difference is that instead of spanning tree, it uses IS-IS for SPB for creating shortest path trees for transporting the frames through the backbone network.

Restricting Multiple Adjacencies Between 2 SPB Nodes:

IS-IS for SPB doesn't allow multiple adjacencies between 2 switches running IS-IS for SPB to avoid loops. IS-IS chooses the adjacency with lowest circuit ID (interface id) on the IS with the higher SysID, and the IIH on the other interfaces may be quietly ignored, so that the adjacencies will not be established. While IS-IS for SPB gets to know about the remote systems circuit ID with 3-way adjacency TLV (240) which carries the information of the circuit ID of the IS-IS node on P2P interfaces. According to the present technology, to advertize the circuit ID of the multi-access interfaces a TLV (IS-IS circuit ID advertisement TLV) is introduced in LAN IIHs which is made up of the following fields:

Type (1 byte)—252
Length (1 byte)—4
Value—4 bytes circuit ID

The method and process steps described above may be implemented in a computing system, of which an example, without limitation, may be found in relation to FIG. 9. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the computing system 300 may comprise various hardware components including one or more single or multi-core processors collectively represented by a processor 901, a solid-state drive 902, a memory 303 and an input/output interface 904. In this context, the processor 301 may or may not be included in a FPGA. In some other aspects, the computing system 300 may be an "off the shelf" generic computing system. In some aspects, the computing system 300 may also be distributed amongst multiple systems. The computing system 300 may also be specifically dedicated to the implementation of the present technology. As a person in the art of the present technology may appreciate, multiple variations as to how the computing system 300 is implemented may be envisioned without departing from the scope of the present technology.

Communication between the various components of the computing system 300 may be enabled by one or more internal and/or external buses 305 (e.g. a PCI bus, universal serial bus, IEEE 1394 "Firewire" bus, SCSI bus, Serial-ATA bus, ARINC bus, etc.), to which the various hardware components are electronically coupled.

The input/output interface 304 may allow enabling networking capabilities such as wire or wireless access. As an example, the input/output interface 304 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 302 may store program instructions, such as those part of, for example, a library, an application, etc. suitable for being loaded into the memory 303 and executed by the processor 301 for the method and process steps according to the present technology.

Figure 4:
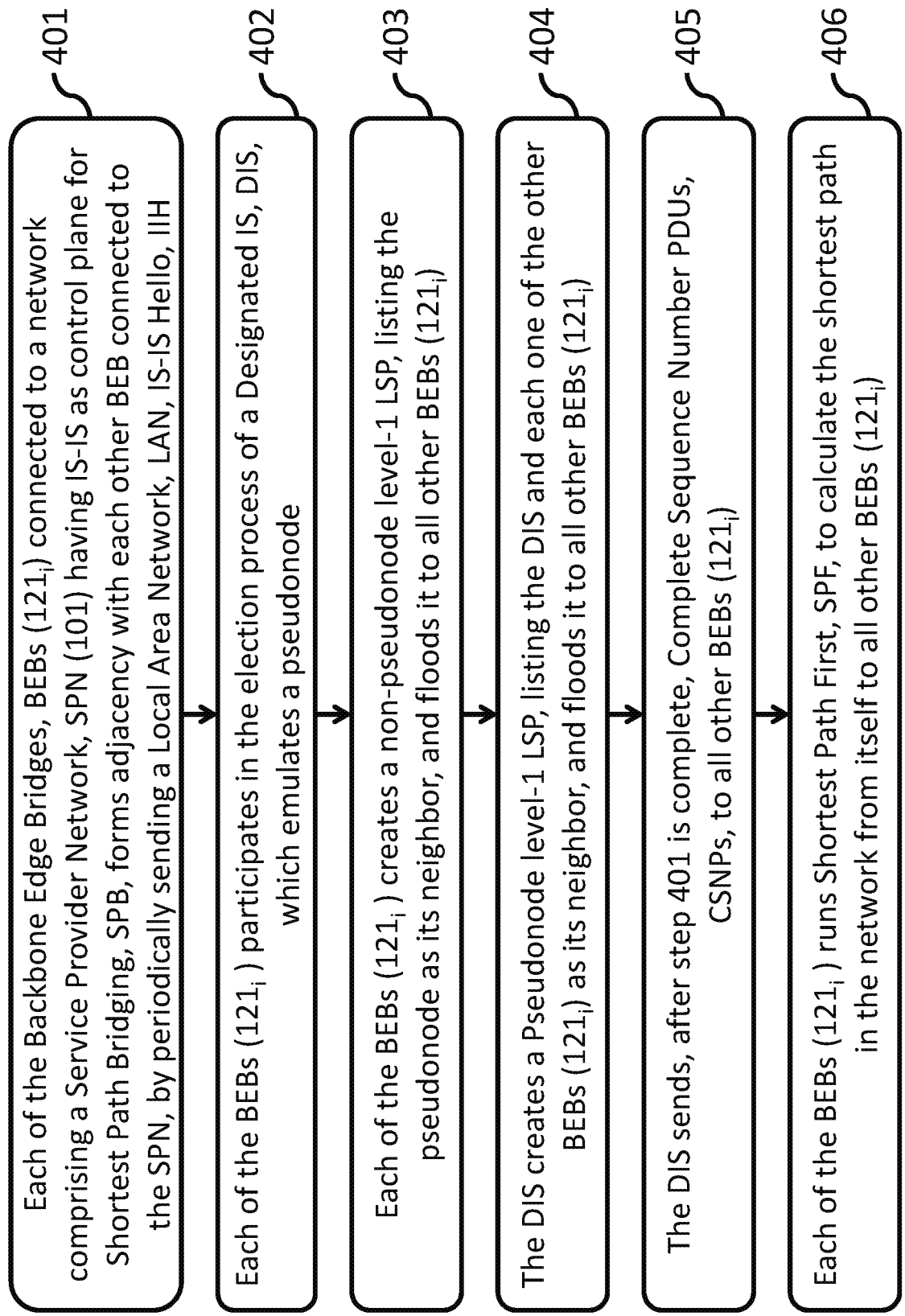
FIG. 4 depicts computer-implemented method steps according to the present technology. It should be noted that, unless otherwise explicitly specified herein, the drawings are not to scale. Further, elements that are identical from one figure to the next share the same reference numerals.

FIG. 4 depicts computing system-implemented method steps according to the present technology. At step 401, each one of BEBs, connected to a network comprising a SPN, having IS-IS as control plane for SPB, forms adjacency with each other BEB connected to the SPN, by periodically sending a LAN IIH. For example the BEBs 121$_i$ and the SPN 101 may be as represented on FIG. 1. At step 402, Each of the BEBs participates in the election process of a DIS, which emulates a pseudonode by creating and flooding a Pseudonode LSP. At step 403, each of the BEBs connected to the SPN creates a non-pseudonode level-1 LSP, listing the pseudonode as its neighbor, and floods it to all other BEBs connected to the SPN. At step 404 and 405 respectively: (i) the DIS creates a Pseudonode level-1 LSP, listing itself and each one of the other BEBs connected to the SPN as its neighbor, and floods it to all other BEBs connected to the SPN, and (ii) sends, once the forming adjacency of step 401 is complete, CSNPs to all other BEBs connected to the SPN. At step 406, each one of the BEBs connected to the SPN runs SPF to calculate the shortest path in the network from itself to all other BEBs connected to the SPN.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for using Intermediate System to Intermediate System, IS-IS, as a control plane for Shortest Path Bridging (SPB) in a network comprising at least a Service Provider Network (SPN) and at least two Backbone Edge Bridges (BEBs) connected to the SPN, the method comprising:

forming adjacency, by each one of the BEBs of the at least two BEBs, with each other BEB of the at least two BEBs, by periodically sending a Local Area Network (LAN) IS-IS Hello (IIH), and listening to LAN IIHs received from each other BEB of the at least two BEBs;

electing one of the BEBs of the at least two BEBs as a Designated Intermediate System (DIS) emulating a pseudonode;

creating by each one of the BEBs of the at least two BEBs, a non-pseudonode level-1 Link State Protocol (LSP) packet, listing the pseudonode as its neighbor, and flooding it to each other BEB of the at least two BEBs;

creating by the DIS a Pseudonode level-1 LSP packet, listing the DIS and each one of the other BEBs of the at least two BEBs as its neighbor, and flooding it to each other BEB of the at least two BEBs;

sending by the DIS, after the forming adjacency, Complete Sequence Number Protocol Data Units (CSNPs), to each other BEB of the at least two BEBs; and running Shortest Path First (SPF) by each of the at least two BEBs to calculate the shortest path in the network from itself to each other BEB of the at least two BEBs;

wherein the LAN IIH is sent to Level 1 IS multicast addresses, with a LAN ID, consisting of the SysID of the DIS plus an octet-long unique ID assigned by the DIS.

2. The method of claim 1, wherein the pseudonode represents a multi-access link, and the Pseudonode level-1 LSP packet lists all the SPB nodes connected to the multi-access link.

3. The method of claim 2, wherein IS-IS for SPB records the list of all hops but the pseudonode during the SPF calculation from one BEB to the other, and wherein the list is used along with ECT an Equal Cost Tree (ECT) mask to break a tie in case SPF finds Equal Cost Multiple Paths (ECMPs).

4. The method of claim 3, wherein a rate of sending LAN IIHs by the DIS, is more than twice a rate of sending LAN IIHs by each other BEB of the at least two BEBs.

5. The method of claim 2, wherein a rate of sending LAN IIHs by the DIS, is more than twice a rate of sending LAN IIHs by each other BEB of the at least two BEBs.

6. The method of claim 1 wherein the sending by the DIS of CSNPs is performed periodically.

7. The method of claim 1 wherein IS-IS for SPB records the list of all hops but the pseudonode during the SPF calculation from one BEB to the other, and wherein the list is used along with an Equal Cost Tree (ECT) mask to break a tie in case SPF finds Equal Cost Multiple Paths (ECMPs).

8. The method of claim 1 wherein a Type Length Value (TLV) is present in LAN IIHs comprising the fields: Type (1 byte)—252, Length (1 byte)—4, and Value—4 bytes circuit ID.

9. The method of claim 1 wherein a rate of sending LAN IIHs by the DIS, is more than twice a rate of sending LAN IIHs by each other BEB of the at least two BEBs.

10. The method of claim 1 wherein the sending of LAN IIHs is to a multicast MAC address 01-80-C2-00-00-14.

11. The method of claim 10 wherein the sending by the DIS of CSNPs is to the multicast MAC address 01-80-C2-00-00-14.

12. A Backbone Edge Bridge (BEB) configured, when connected to a Service Provider Network (SPN) to which at least one other BEB is connected, and in which Intermediate System to Intermediate System (IS-IS) is used as a control plane for Shortest Path Bridging (SPB) to:

form adjacency, with the at least one other BEB, by periodically sending a Local Area Network (LAN) IS-IS Hello (IIH), and listening to LAN IIHs received from the at least one other BEB;

elect itself or the at least one other BEB, as a Designated IS (DIS) emulating a pseudonode;

create a non-pseudonode level 1 Link State Protocol (LSP) packet listing the pseudonode as its neighbor, and flooding it to the at least other BEB;

if elected as the DIS:
create a Pseudonode level-1 LSP packet, listing the DIS and the at least one other BEB as its neighbor, and flooding it to the at least one other BEB; and
send, after the forming adjacency, Complete Sequence Number Protocol Data Units (CSNPs), to the at least one other BEB; and run Shortest Path First (SPF) to calculate the shortest path in the network from itself to the at least one other BEB;

wherein the LAN IIH is sent to Level 1 IS multicast addresses, with a LAN ID, consisting of the SysID of the DIS plus an octet-long unique ID assigned by the DIS.

13. The BEB of claim 12, wherein the pseudonode represents a multi-access link, and the BEB is configured to, when elected as a DIS, send a Pseudonode level-1 LSP packet listing all the SPB nodes connected to the multi-access link.

14. The BEB of claim 12, configured to support a Type Length Value (TLV) present in LAN IIHs comprising the fields: Type (1 byte)—252, Length (1 byte)—4, and Value—4 bytes circuit ID.

15. The BEB of claim 12, configured to send LAN IIHs to a multicast MAC address 01-80-C2-00-00-14.

16. The BEB of claim 15, configured to send, when elected as a DIS, CSNPs to the multicast MAC address 01-80-C2-00-00-14.

17. The BEB of claim 12, wherein IS-IS for SPB records the list of all hops but the pseudonode during the SPF calculation from one BEB to the other, and wherein the list is used along with ECT mask to break the tie in case SPF finds Equal Cost Multiple Paths (ECMPs).

18. The BEB of claim 17, wherein a rate of sending LAN IIHs by the DIS, is more than twice a rate of sending LAN IIHs by each other BEB of the at least one other BEB.

19. The BEB of claim 12, wherein a rate of sending LAN IIHs by the DIS, is more than twice a rate of sending LAN IIHs by each other BEB of the at least one other BEB.

* * * * *